(12) United States Patent
Ewalt et al.

(10) Patent No.: US 6,459,275 B1
(45) Date of Patent: Oct. 1, 2002

(54) DETECTION OF DEVICES ON A LOCAL AREA NETWORK

(75) Inventors: John E. Ewalt, Northglenn; Dieter John Henry Knollman, Arvada, both of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 44 days.

(21) Appl. No.: 09/796,236

(22) Filed: Feb. 28, 2001

(51) Int. Cl.⁷ .............................................. H01H 31/02
(52) U.S. Cl. ....................................................... 324/539
(58) Field of Search ................................. 324/539, 600; 307/38, 39, 85, 86, 87; 700/293, 295; 713/300, 330, 340; 370/241, 245

(56) References Cited

U.S. PATENT DOCUMENTS

| | | | | |
|---|---|---|---|---|
| 5,432,946 A | * | 7/1995 | Allard et al. ................ | 395/750 |
| 5,990,577 A | * | 11/1999 | Kamioka et al. ............. | 307/26 |
| 6,087,835 A | * | 7/2000 | Haneda ........................ | 324/539 |
| 6,301,674 B1 | * | 10/2001 | Saito et al. .................. | 713/340 |

* cited by examiner

Primary Examiner—N. Le
Assistant Examiner—Etienne P LeRoux
(74) Attorney, Agent, or Firm—John C. Moran

(57) ABSTRACT

Determining that a slope of test values resulting from two test conditions being applied to a remote device via a network connection and a reference circuit is within a predetermined range, and applying full power to the remote device if the slope is within the predetermined range. The determination using the slope reduces the effects of voltage drop variation caused by diodes and leakage of current by transistors in the remote device. The determination is performed by first applying a first reference voltage to both the remote device and reference circuit and storing the resulting two voltages. Next, a second reference voltage is applied to both the remote device and reference circuit and the resulting two voltages are stored. A first difference is calculated from the two voltages resulting from the testing of the remote device, and a second difference is calculated from the two voltages resulting from the testing of the reference circuit. The absolute difference between the first and second differences is calculated. Finally, the absolute difference is compared with the predetermined range.

12 Claims, 8 Drawing Sheets

DETECTION OF DEVICES ON A LOCAL AREA NETWORK

TECHNICAL FIELD

This invention relates to local area networks, and in particular, to the provisioning of power to terminals via the local area network.

BACKGROUND OF THE INVENTION

Within the prior art, telephone switching systems such as PBXs have traditionally provided the power to telephone sets via a telephone link between the telephone set and the telephone switching system. The power supplied to the telephone sets has been at 48 volts. Local area networks on the other hand have not within the prior art provided power to devices connected to the LAN. These devices have been personal computers (PC), printers, etc. Devices such as PCs and printers receive their power from batteries or power supplies that plug in to a local AC power outlet. Within the prior art it is known to add telephone sets to a LAN by providing local power from an AC power outlet to the telephone set. However, this is not generally acceptable to customers. The problem of supplying power via the LAN (referred to as phantom power) is complicated because the LAN will have a mixture of telephone sets and other devices requiring phantom power and devices that do not require power from the LAN. Nor, is a device such as a PC capable of withstanding 48 volts of phantom power in its LAN connections. In addition, whereas within a four-pair LAN wiring system only two of the pairs are utilized for data and there is indeed a spare pair that could be used for power, it is common for all of the pairs to have approximately 75 ohms of terminating resistance placed across the unused pair so as to balance the pair and reduce noise induction. Further, in the field, there is no control over what will be plugged in to different connections of the LAN. So it is quite possible that a PC will be plugged in to the LAN and suffer damage. Conversely, it is possible that someone will plug in a legacy telephone set that can withstand the 48 volts but is totally incompatible with the operation of the LAN.

Within the prior art, it has been proposed that a device wishing to receive phantom power via the LAN provide a signature of a 25 KΩ resistor when initial power is applied via the LAN pairs. The 25 KΩ resistor may reside behind or in front of a polarity guard that comprises diodes and/or transistors. The polarity guard protects the telephone set from the possibility that voltage will be applied in the reverse direction. The polarity guard causes the value of the 25 KΩ resistor to vary due to temperature, the voltage drop variation caused by diodes and leakage of current by transistors. Further, because of the existence in many existing installations of LANs of the unused pair being terminated by 75 ohm resistors and the unused pair being a common choice for the phantom power the testing for the 25 KΩ resistor is quite complicated.

SUMMARY OF THE INVENTION

This invention is directed to solving these problems and other disadvantages of the prior art by determining that a slope of test values resulting two reference voltages being applied to a remote device and a reference circuit is within a predetermined range and applying full power to the remote device if the slope is within the predetermined range. Advantageously, the determination using the slope greatly reduces the effects of voltage drop variation caused by diodes and leakage of current by transistors in the remote device. The determination is performed by first applying the first reference voltage to both the remote device and reference circuit and storing the resulting two voltages. Next, the second reference voltage is applied to both the remote device and reference circuit and the resulting two voltages are stored. A first difference is calculated from the two voltages resulting from the testing of the remote device, and a second difference is calculated from the two voltages resulting from the testing of the reference circuit. The absolute difference between the first and second differences is calculated. Finally, the absolute difference is compared with the predetermined range.

Advantageously, before the determination is made, the remote device is tested to assure that the impedance of the remote device is within a second predefined range. The testing is performed by applying the first test voltage to both the remote device and reference circuit and calculating the expected voltages for the second predefined range from the test result obtained from the reference circuit.

Other and further aspects of the present invention will become apparent during the course of the following description and by reference to the accompanying drawing.

DETAILED DESCRIPTION

Figure 1:
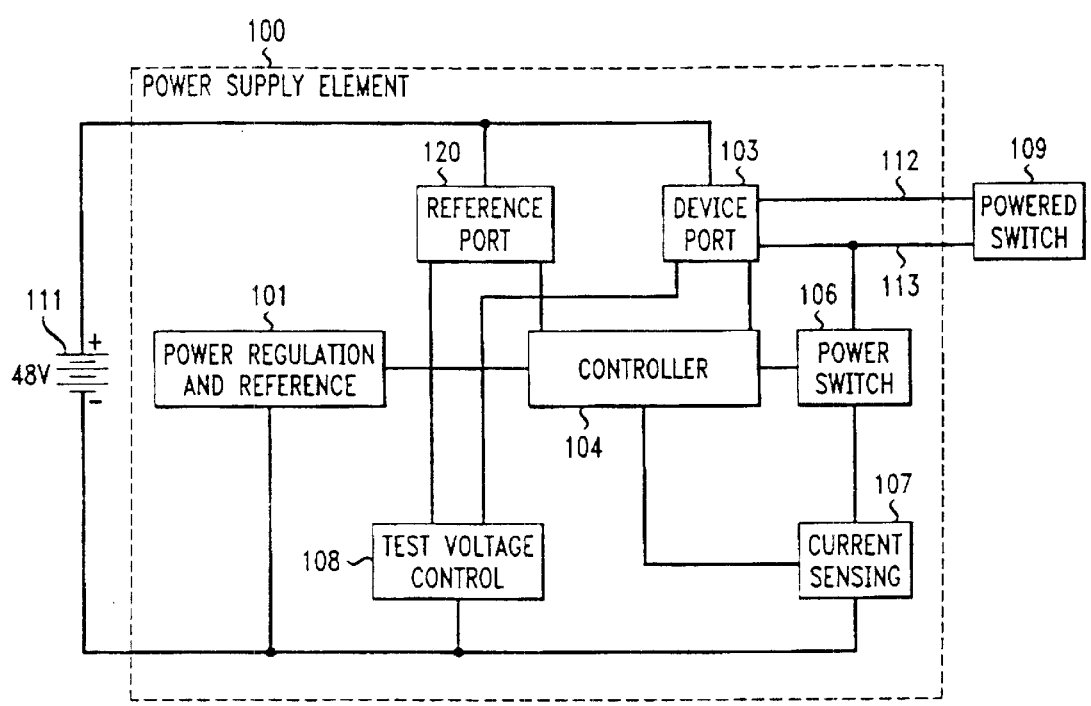
FIG. 1 illustrates, in block diagram form, a power supply element interconnecting a battery and a powered device.

FIG. 1 illustrates power supply element 100 interconnected to battery 111 and powered device 109. Advantageously, powered device 109 may be a telecommunication set connected to a local area network (LAN) or another device requiring phantom power from the LAN. Links 112 and 113 from device port 103 are part of the links of the LAN, and power is placed on these links using various phantom methods that are well-known to those skilled in the art.

Power regulation and reference 101 provides power regulation and reference to provide a 5 volt power supply that is utilized by controller 104 as power and as a stable reference for an internal analog-to-digital (A/D) converter within controller 104. Test voltage control 108 is utilized to generate two different voltages used to sense the signature resistor in both powered device 109 and reference port 102. Advantageously, these two voltages are 12 and 24 volts which are low current limited so that they will not cause any damage if indeed powered device 109 is not present on links 112 and 113. Reference port 102 is utilized as a comparison against the measurements that are observed with respect to device port 103 and powered device 109. Reference port 102 includes a signature resistor and diodes that are assumed to be part of powered device 109. The comparison in accordance with the invention allows variations due to voltage from battery 111 and the diodes in powered device 109 to be eliminated from the measurements. This elimination allows an accurate determination of whether a signature resistor which advantageously maybe 25 KΩ is present in powered device 109. Device port 103 is equivalent to reference port 102 with the exception that no diodes or signature resistor is present. The diodes which form the polarity guard at signature resistor are part of powered device 109.

Power switch 106 is utilized to place the full output voltage of battery 111 on links 112 and 113 when it has been determined by controller 104 that the signature resistor is present in powered device 109. After the full voltage of battery 111 has been applied to links 112 and 113 by power switch 106, current sensing block 107 monitors to establish that powered device 109 is drawing a current within a maximum and a minimum range. If powered device 109 current is outside of this range, controller 104 turns power switch 106 off. Controller 104 not only provides the overall control of power supply element 100 but also contains A/D converters that are utilized to sense various voltages produced by the reference port 102, device port 103 and current sensing block 107.

Because of concern for the generation of electrical noise on a LAN, controller 104 performs two initial tests to determine if a powered device is connected to links of 112 and 113. In addition, as is discussed in greater detail with respect to FIG. 7, initially, a powered device must present to links 112 and 113 a 25 KΩ signature resistance and may also have a polarity guard comprising diodes or transistors. Only after the voltage across links 112 and 113 exceeds 30 volts, may a powered device start to draw power and present capacitance to links 112 and 113. In the initial state, power supply element 100 should only see a 25 KΩ resistance with an accompanying polarity guard. In order to not constantly be switching between 12 and 24 volts on links 112 and 113, controller 104 determines if the resistance across links 112 and 113 is within the range of 12.5 KΩ to 50 KΩ. If the resistance presented on links 112 and 113 by the powered device is within this range, controller 104 performs the measurements necessary to calculate a delta value. This test is performed at 12 volts.

Reference port 102 is similar in electrical characteristics to device port 103 coupled to powered device 109 via links 112 and 113. The delta value is. calculated by first determining the voltages across reference port 102 and device port 103 coupled to powered device 109 at 12 volts and then, measuring the voltages again at 24 volts. The delta value is the absolute value of the difference of the voltage in reference port 102 at 12 and 24 volts minus the difference in the voltage in device port 103 at 12 and 24 volts. By calculating the delta value in this manner, variations due to the voltage of battery 111 are eliminated. As well as, differences in the polarity guards of reference port 102, and the polarity guard utilized in powered device 109. Finally, the delta value eliminates the effect of temperature in both reference port 102 and device port 103 coupled to powered device 109. In addition, controller 104 performs the measurements for the calculation of the delta value in such a manner so as to eliminate the effect of any 60 $H_z$ ripple on the voltage produced by battery 111.

Figure 2:
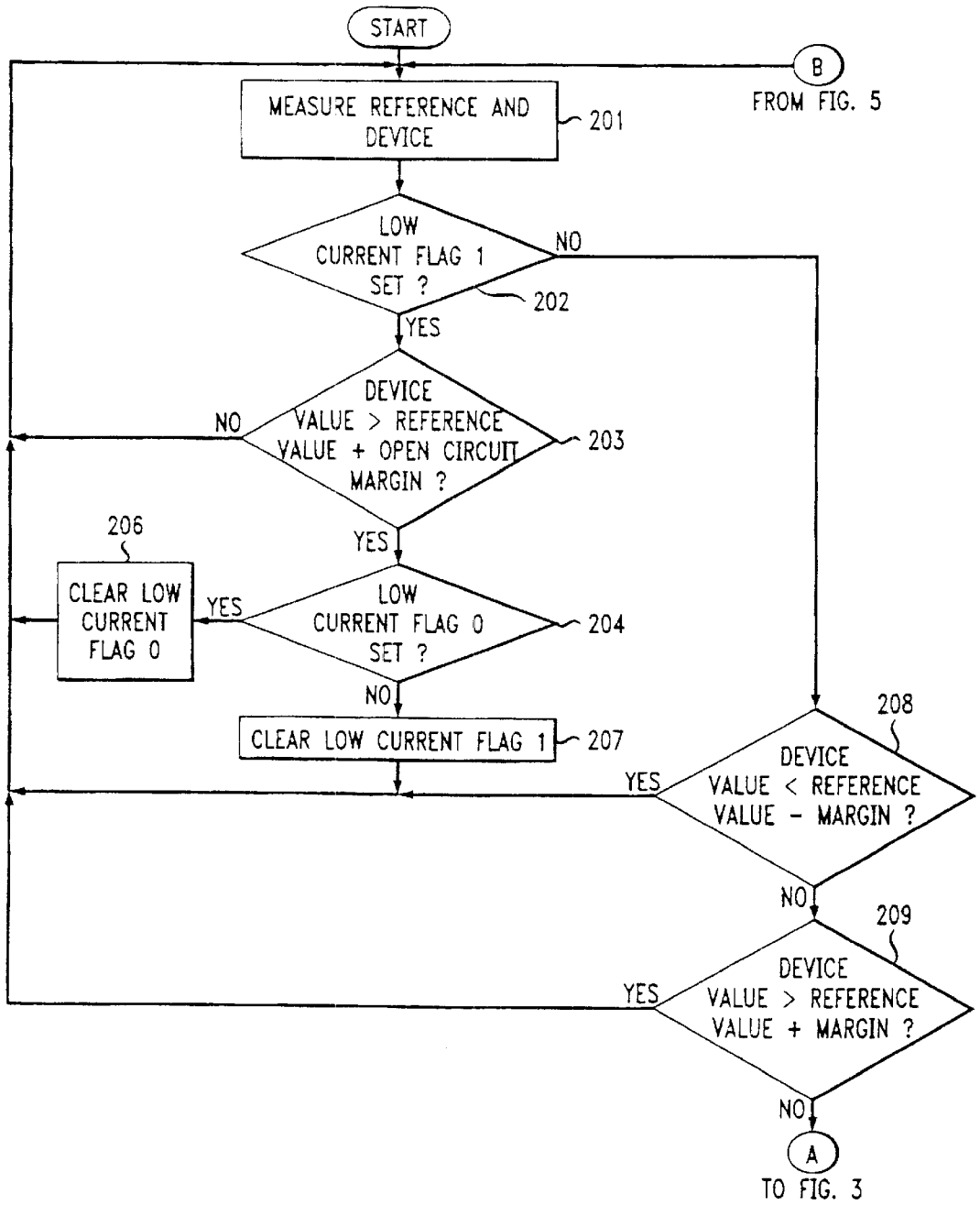
FIGS. 2–6 illustrate, in flowchart form, steps performed by a power supply element.

FIGS. 2–6 illustrate, in flowchart form, the operations performed by controller 104 to determine and control power being supplied to powered device 109 from battery 111. FIG. 2 illustrates the operations that are initially performed to determine whether or not to proceed with the delta measurement of powered device 109 in preparation for applying full power to powered device 109. These operations are based on an initial resistance measurement of powered device 109 within a greater range than is required before actual power is applied, and test voltage control 108 supplies 12 volts to reference port 102 and device port 103. Advantageously, this greater range is allowed to be 12.5 KΩ to 50 KΩ for the signature resistor of powered device 109.

The steps illustrated in FIG. 2 are performed when a device is first attached to the LAN or after a fault condition has been detected where powered device 109 was drawing either too much or too little current after full power having been applied. After being started, block 201 measures the voltage observed across both the reference port 102 and device port 103 including the connection to powered device 109. The reference port 102 is measured to eliminate any fluctuations due to battery 111. Next, decision block 202 determines if the low current flag 1 is set. If powered device 109 after being powered on drew either too much or too little current, both low current flag 1 and low current flag 0 will be set. This is done so that the measurement made in block 201 has to be made at least twice. If low current flag 1 is set, decision block 202 transfers control to decision block 203. Decision block 203 compares the device value against the reference value increased so that it assumes that a 250 KΩ has replaced the 25 KΩ signature resistor. The 250 KΩ resistor is used to simulate and open circuit condition at powered device 109. If the decision in decision block 203 is no, control is transferred back to block 201 for a new measurement. If there is a load that is less than 250 KΩ connected to links 112 and 113 and low current flag 1 is set, controller 104 continuously executes blocks 201, 202, and 203. If the load is outside of the range 12.5 KΩ to 50 KΩ and low current flag 1 is not set, blocks 201, 202, 208 and 209 are continuously executed. If the answer in decision block 203 is yes, decision block 204 determines if low current flag 0 is set. If the answer is yes, block 206 clears low current flag 0 and transfers control back to block 201. The result will be that the operations described for blocks 201, 202, 203 are performed again. If the answer in decision block 203 is yes, control is transferred to decision block 204. Since low current flag 0 had been previously cleared, control is transferred to block 207 which clears low current flag 1 before returning control back to block 201. Block 201 now re-measures and transfers control to decision block 202. Since low current flag 1 was previously cleared, decision block 202 transfers control to decision block 208.

Decision blocks 208 and 209 compare the device value against the values that would be calculated if the signature resistor in reference port 102 had been a 12.5 KΩ resistor (25 KΩ–50%) for decision block 208 and a 50 KΩ resistor (25 KΩ+100%) for decision block 209. This establishes a maximum range for the resistance in powered device 109 before any additional tests are performed. If the answer in either decision block 208 or 209 is yes, control is transferred back to block 201. If however the signature resistor of powered device 109 is within this expanded range, control is transferred to block 301 of FIG. 3.

Figure 3:
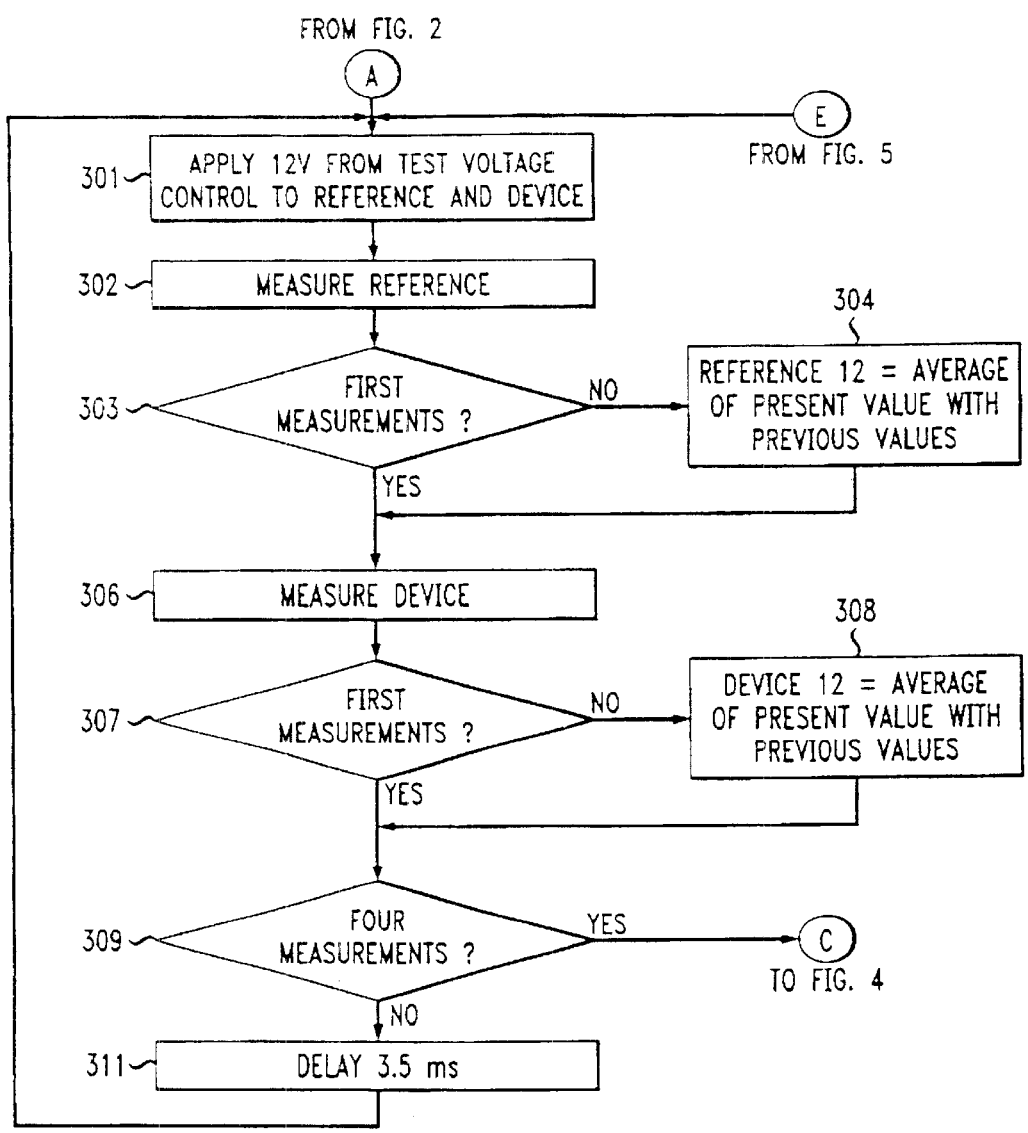
Figure 4:
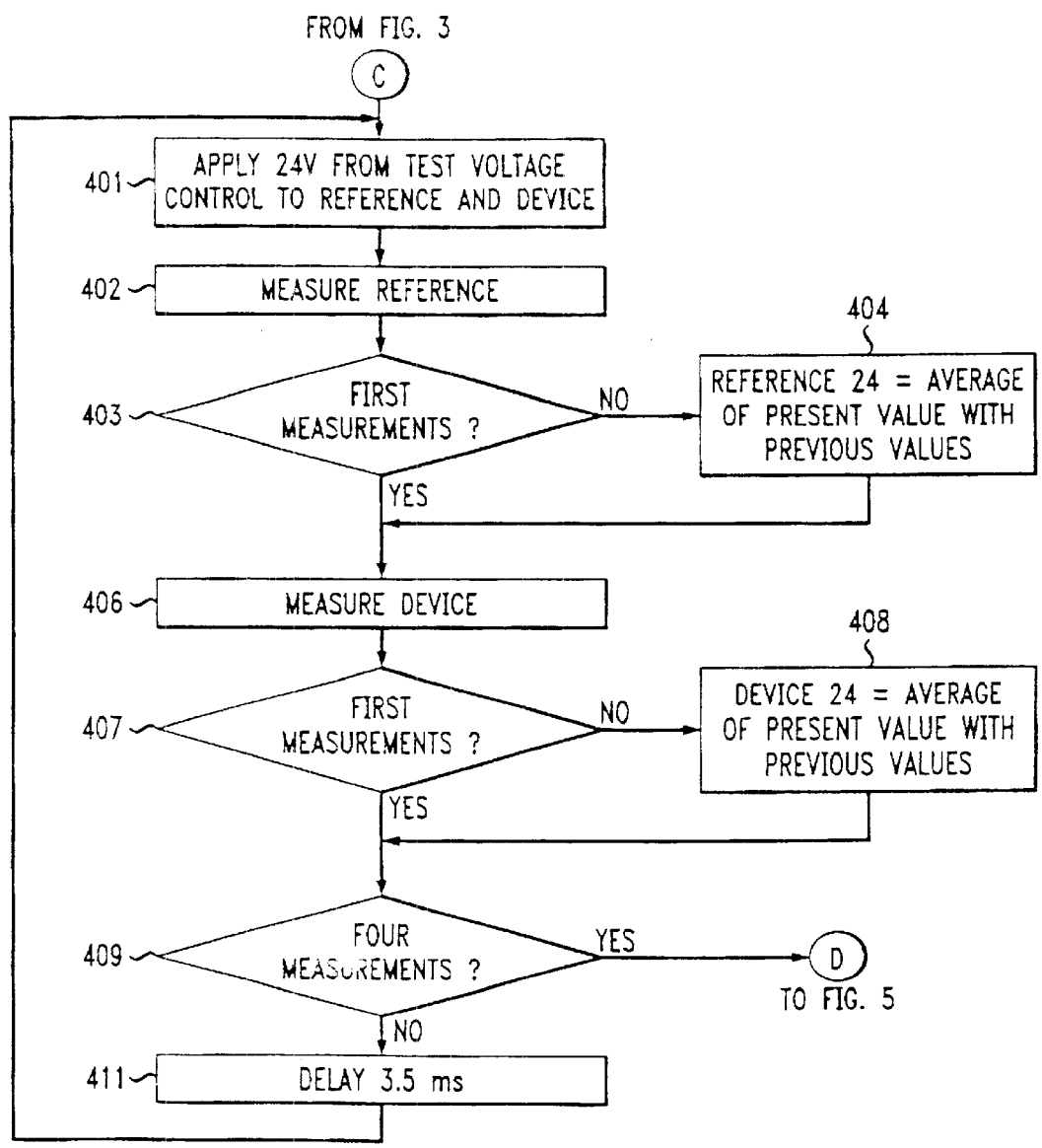
Figure 5:
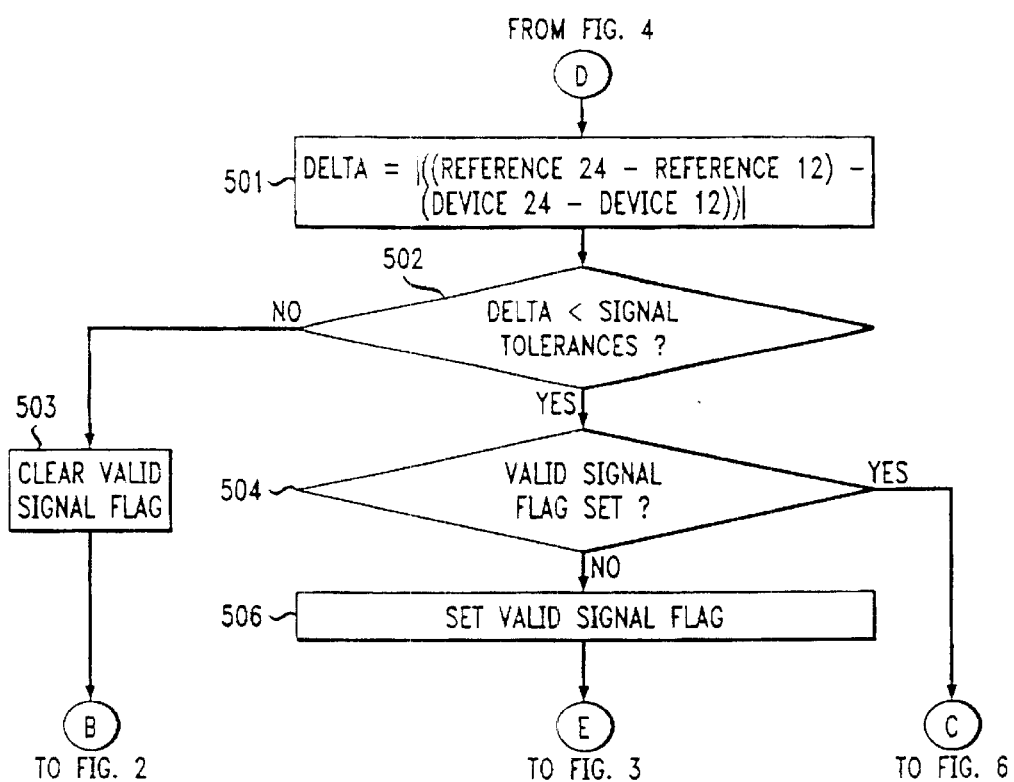

The steps set forth in FIG. 3 result in measurements to determine the delta measurements values at 12 volts. The steps illustrated in FIG. 4 are the operations performed to determine the delta measurements for 24 volts. Finally, FIG. 5 is the actual calculation of the delta value and determination if this delta is within the necessary tolerances for applying full power to powered device 109. To calculate the delta as is performed by block 501 of FIG. 5, the voltages for both reference port 102 and device port 103 must be determined for both 12 and 24 volts.

Step 301 of FIG. 3 first applies 12 volts to both reference port and device port 103. Block 302 then measures reference port 102. Note, the steps illustrated in FIG. 3 are performed four times with each measurement being delayed by 3.5 ms so as to eliminate the possibility of 60 $H_z$ ripple on the output of battery 111 skewing the measurements. The four sets of measurements are averaged. After the measurement of the voltage of reference port 102, decision block 303 determines if this is the first of the four measurements. If the answer is no, block 304 averages the present measurement in with previous measurements storing the result in variable, reference 12. After execution of block 304 or a yes result from decision block 303, control is transferred to block 306 which measures the voltage of device port 103. Again, block 307 determines if this is the first measurement or not. If it is not the first measurement, the present measurement is averaged with previous measurements and the result is placed in variable, device 12 before transferring control to decision block 309. Decision block 309 determines if four measurements have been made of both reference port 102 and the device port 103. If the answer is no, block 311 delays for 3.5 ms before transferring control back to decision block 301. If the answer in decision block 309 is yes, control is transferred to block 401 of FIG. 4.

Steps 401–411 are identical to steps 301–311 of FIG. 3 with the exception that steps 401–411 are performed while test voltage control 108 is applying 24 volts to reference port 102 and device port 103. After the steps illustrated in FIG. 4 have been performed four times, control is transferred to block 501 of FIG. 5.

Block 501 calculates the absolute value between the difference of the voltages of reference port 102 at 24 volts and 12 volts from the difference of the voltages of device port 103 at 24 and 12 volts. After the delta has been calculated, decision block 502 determines if this delta is below a signal tolerance which advantageously may be 10 millivolts. This signal tolerance allows the signature resistor in powered device 109 to range between 23 KΩ and 28 KΩ resistance. The valid signal flag assures that the operations of FIGS. 3 and 4 are performed twice before full power is supplied to powered device 109. If decision block 502 determines that the delta is greater than the acceptable signal tolerance, block 503 clears the valid signal flag and returns control back to block 201 of FIG. 2 thus starting the entire measurement process over again. If decision block 502 determines the delta is within the necessary tolerance, decision block 504 determines if the valid signal flag is set. If the answer is no block 506 sets the valid signal flag and returns control to block 301 of FIG. 1 so that the measurements and calculations of the delta can be performed again by the operations illustrated in the blocks of FIGS. 3 and 4 with blocks 501 and 502 of FIG. 5. This second set operations is done to verify the first set of operations. If the answer in decision block 504 is yes that the valid signal flag is set indicating that the calculations have been performed twice through FIGS. 3–5, control is transferred to block 601 so that the full power may be applied from battery 111 to powered device 109.

Block 601 turns on power switch 106. The determination of whether the current being drawing by powered device 109 is within the specified range is determined in two ways. If powered device 109 is drawing too much power, current sensing block 107 causes an interrupt to controller 104 so that controller 104 can immediately respond to this condition. The determination of whether powered device 109 is drawing too little current is made by blocks 604–613 and 616. After power is turned on by block 601, block 602 enables the interrupt for the detection of the over-current condition (advantageously 350 ma) from current sensing block 107. If such an interrupt occurs, the interrupt transfers control to decision block 618 via block 617. After a delay, decision block 618 re-examines the input referred to as a bit causing the interrupt from current sensing block 107 to assure that current sensing block 107 is still indicating an over-current condition. This is done so as to prevent noise from causing power switch 106 to be turned off. If the answer in decision block 618 is yes, control is transferred to block 614 which turns off power switch 106. If the result in decision block 618 is that noise has caused the interrupt, block 619 returns controller 104 to the processing that had been interrupted.

Figure 6:
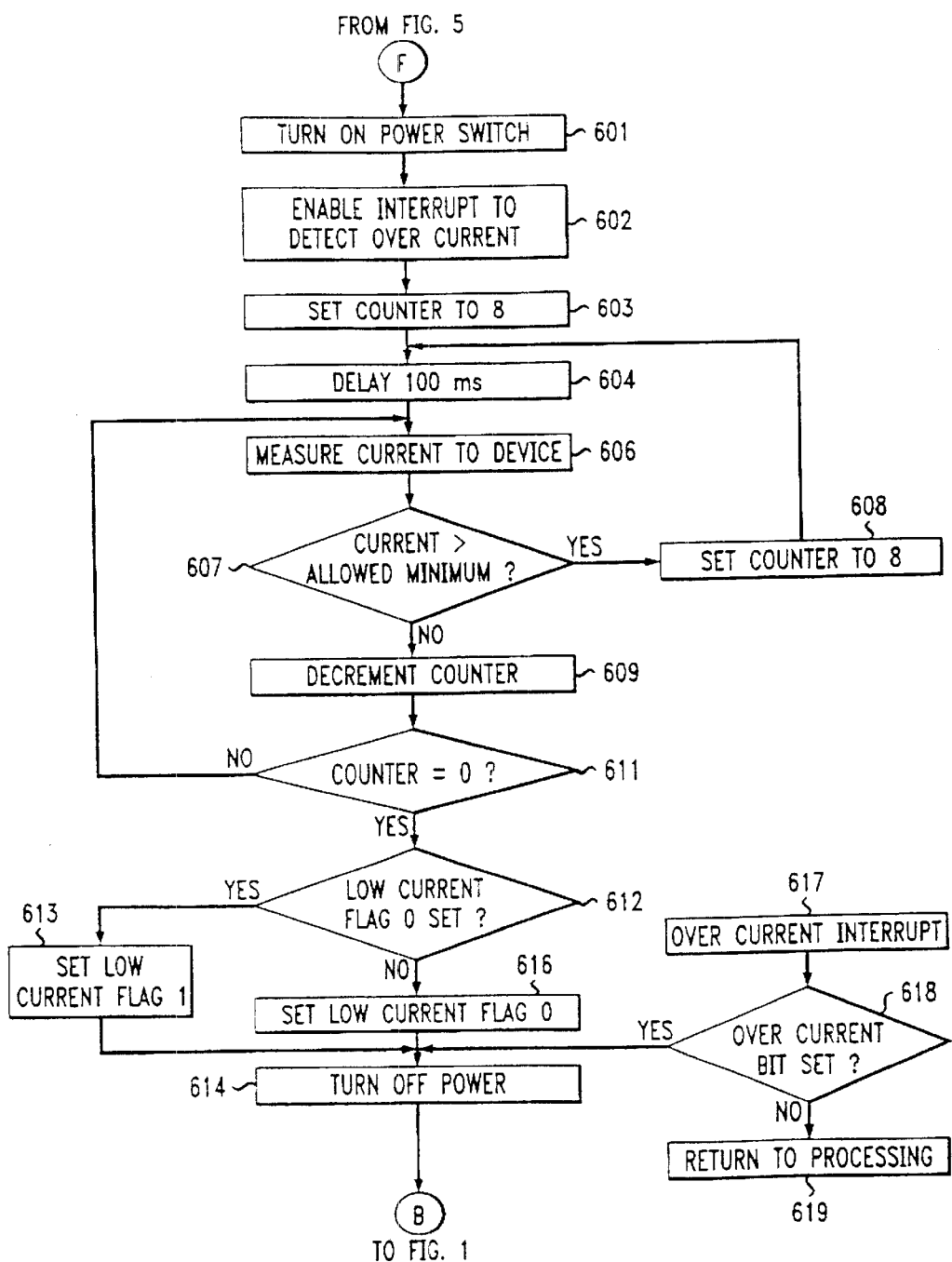

Returning to block 603 of FIG. 6, block 603 sets a counter to eight so that the undercurrent measurement has to be made eight consecutive times before power will be turned off. If low current is detected, full power is turned off on the assumption that powered device 109 has failed, has been disconnected or simply has been turned off. In these cases, the proper power sequencing must be done when a new device connected or powered device 109 is turned on. After execution of block 603, control is transferred to block 604 which delays for 100 ms before the current is measured via current sensing 107 by block 606. Decision block 607 then determines if the current is greater than the allowed minimum that advantageously is 10 ma. If the answer is yes, the counter is set back to eight by block 608 before control is returned to block 604. If the answer is no in decision block 607, block 609 decrements the counter by one before transferring control to decision block 611. The latter decision block determines if the counter is equal to zero. If the counter is not equal to zero, control is transferred back to block 606. If the counter is equal to zero, control is transferred to decision block 612. The latter decision block determines if the low current flag 0 is set. If the answer is no, block 616 sets the low current flag 0 and transfers control to block 614 so that full power can be removed from powered device 109. If the answer in decision block 612 is yes, control is transferred to block 613 which sets the low current flag 1.

Figure 7:
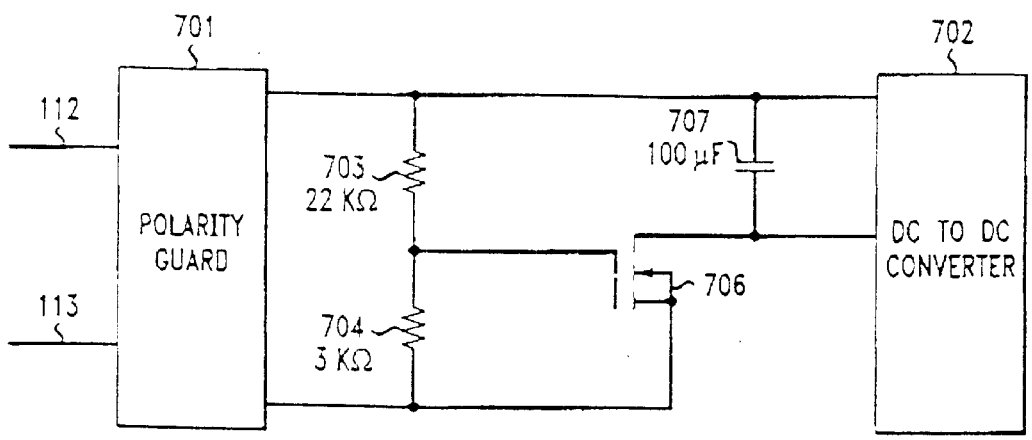
FIG. 7 illustrates a powered device in greater detail.

FIG. 7 illustrates a schematic of circuitry that could be utilized in powered device 109 to perform the necessary sequencing of resistance and capacitance as required to function with power supply element 100 of FIG. 1. Polarity guard 701 may have diodes and/or transistors using techniques that are well known in the art. DC to DC converter 702 is capable of producing the desired voltages for use by the powered device from 48 volts. Initially, the impedance seen looking into the circuitry of FIG. 7 from links 112 and 113 is primarily that of polarity guard 701 and resistors 703 and 704. With only 12 volts appearing across links 112 and 113, transistor 706 is in the off state, and the impedance of capacitor 707 and DC to DC converter 702 is negligible. This is also true of a voltage at 24 volts. Hence, controller 104 in performing the previously described operations of FIGS. 2–6 sees only the characteristics of polarity guard 701 and resistors 703 and 704. Resistors 703 and 704 place 25 KΩ across links 112 and 113 via the polarity guard. After controller 104 has finished all the measurements and is applying a full 48 volts across links 112 and 113, transistor 706 slowly turns on via the voltage placed on the base of transistor 706. Transistor 706 is a MOSFET transistor; hence, transistor 706 gradually turns on placing the capacitance of capacitor 707 along with the impedance of DC to DC converter 702 across links 112 and 113. Transistor 706 is turned on when 30 volts appear across links 112 and 113. One skilled in the art could readily envision how to change the turn on voltage of transistor 706 to a different voltage by adjusting the ratio of resistor 703 and 704.

Figure 8:
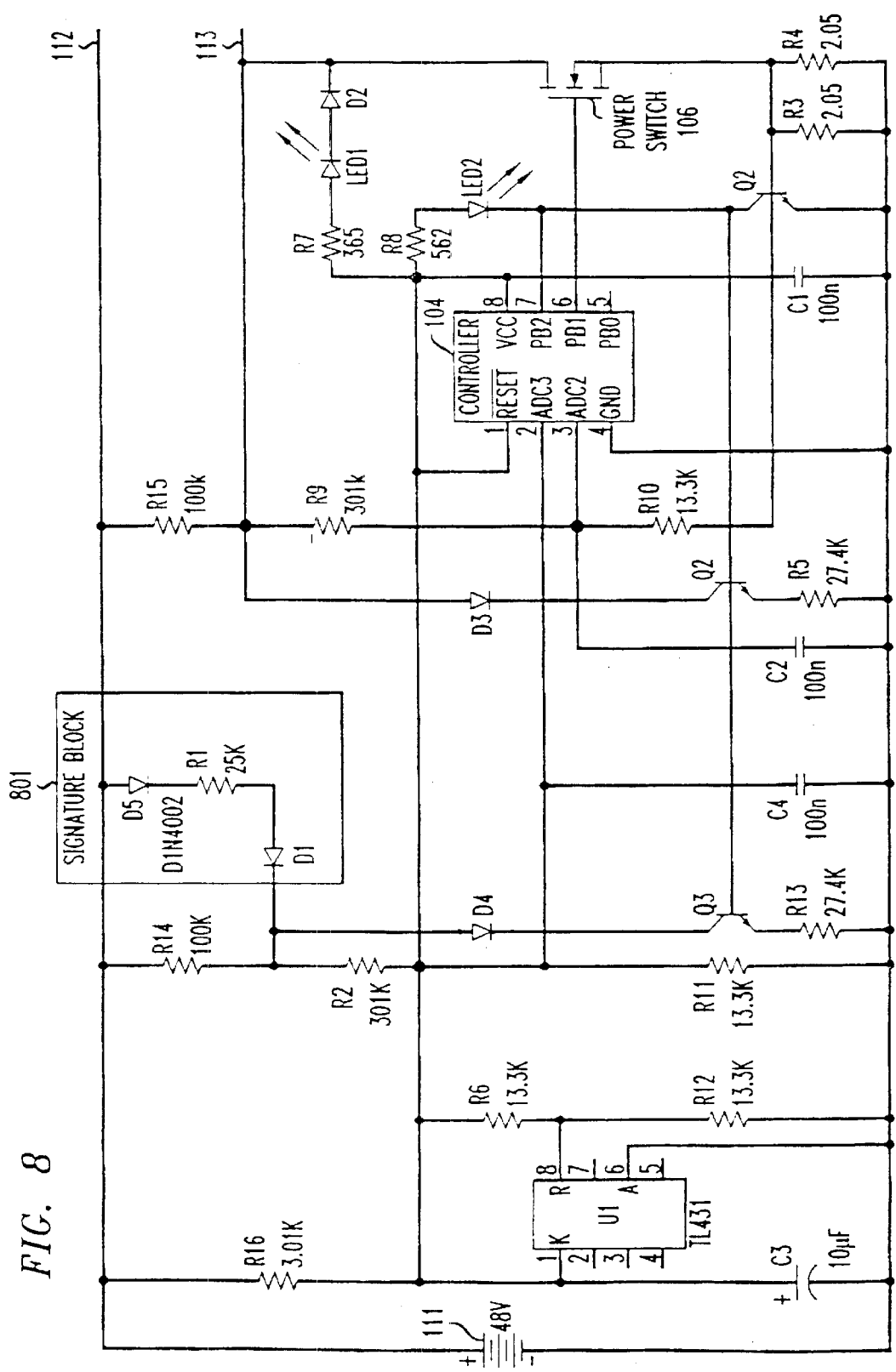
FIG. 8 illustrates a power supply element in greater detail.

FIG. 8 illustrates a schematic of power supply element 100. Power regulation and reference block 101 of FIG. 1 comprises capacitor C3 and U1 (a 5 volt regulator), and resistors R16, R6, and R12. Reference port 102 comprises signature block 801, resistors R14, R2, R11 and diode D4. (One skilled in the art could envision that D4 could be eliminated under certain conditions.) Signature block 801 comprises diodes D1 and D5 and resistor R1. Device port 103 comprises resistors R15, R9, R10, and R5, diode D3 and transistor Q2. Current sensing block 107 comprises transistor Q1 and resistors R3 and R4. Power switch 106 is a single power MOSFET. Test voltage control block 108 comprises transistors Q2 and Q3 and the resistors R5 and R13.

When transistors Q2 and Q3 and power switch 106 are off, 12 volts is supplied to reference port 102 and device port 103. The 12 volts to reference port 102 is supplied via resistors R14, R2, and R11. To place 24 volts on reference port 102 and device port 103, controller 104 turns transistors Q3 and Q2 on via output pin 7. Note, the output point 7 is later used as an input for the interrupt indicating a high current condition. With Q3 turned on, 24 volts is supplied to reference port 102 via resistor R14, diode D4, transistor Q3, and resistor R13 in parallel with resistors R2 and R11. A similar operation is performed with respect to device port 103. Controller 104 senses the voltage across reference port 102 via input 2 and the voltage across device port 103 via input 3. These inputs are connected internally to A/D convertors. Capacitors C1, C2, and C4 are utilized for filtering purposes. Resistors R7 and R8, LED 1 and LED 2, and diode D2 are used to perform indication functions.

To supply full power at 48 volts to links 112 and 113, controller 104 turns on power switch 106 via output pin 6. Upon turning on power switch 106, controller 104 reconfigures pin 7 so that it is now an input connected to an interrupt. Controller 104 also enables the interrupt at this time. If too much power is being drawn by the power device, sufficient current flows from link 112 through the power device to link 113 through power switch 106 and resistors R3 and R4 creating a voltage that is sufficient across R3 and R4 to turn transistor Q1 on causing an interrupt via input pin 2. At full power across links 112 and 113, the low current state is determined by connecting input 3 that connects to an internal A/D convertor in controller 104 to the voltage developed by the current flowing from power switch 106 across resistors R3, R4, via resistor R10.

What is claimed is:

1. A method for supplying power to a remote device via a network connection, comprising the steps of
    applying a first test condition via the network connection to the remote device;
    measuring a first test result from the application of the first test condition to the remote device;
    applying the first test condition to a reference circuit;
    measuring a second test result from the application of the first test condition to the reference circuit;
    applying a second test condition via the network connection to the remote device;
    measuring a third test result from the application of the second test condition to the remote device;
    applying the second test condition to the reference circuit;
    measuring a fourth test result from the application of the second test condition to the reference circuit;
    calculating a first difference between the first test result and the third test result;
    calculating a second difference between the second test result and the fourth test result;
    calculating a third difference between the second difference and the first difference;
    comparing the third difference with a predefined range; and
    applying power to the remote device upon the third difference being in the predefined range.

2. The method of claim 1 wherein in the first and second test conditions are a first and second voltages, respectively.

3. The method of claim 2 wherein the third and fourth test results are a third and fourth test voltages, respectively.

4. The method of claim 3 wherein the step of calculating the first difference comprises the step of subtracting the first test voltage from the third test voltage; and
    step of calculating the second difference comprises the step of subtracting the second test voltage from the fourth test voltage.

5. The method of claim 4 wherein the step of calculating the third difference comprises the step of obtaining an absolute value of a result obtained from subtracting the first difference from the second difference.

6. The method of claim 2 further comprises the step of determining a presence of a load on the network connection before application of the first test voltage.

7. The method of claim 6 wherein the step of determining comprises the steps of applying the first voltage to the network connection;
    measuring a fifth test voltage;
    applying the first voltage the reference circuit;
    measuring a sixth test voltage;
    calculating a voltage range by adjusting the sixth test voltage by two predefined values; and
    comparing the fifth test voltage with the calculated voltage range.

8. The method of claim 7 further comprises the step of removing power upon the remote device drawing an amount of current outside of a predefined current range.

9. Apparatus for supplying power to a remote device via a network connection, comprising:
    power supply;
    a device port connected to the remote device via the network connection;
    a controller;
    a first circuit for adjusting an output of the power supply to supply a first test condition to the remote device and a reference circuit;
    the device port transmitting a first test result to the controller in response to the first test condition;
    the reference circuit transmitting a second test result to the controller in response to the first test condition;
    the first circuit for adjusting the output of the power supply to supply a second test condition to the remote device and the reference circuit;
    the device port transmitting a third test result to the controller in response to the second test condition;
    the reference circuit transmitting a fourth test result to the controller in response to the second test condition;
    the controller calculating a first difference between the first test result and third test result;
    the controller further calculating a second difference between the second test result and fourth test result and;
    the controller controlling the power supply to supply power to the remote device upon an absolute value of the first and second differences being with a predefined range.

10. The apparatus of claim 9 wherein in the first and second test conditions are a first and second voltages, respectively.

11. The apparatus of claim 10 wherein in the first and second test results are a first and second test voltages, respectively; and
    the third and fourth test results are a third and fourth test voltages, respectively.

12. The apparatus of claim 11 wherein the controller calculates the first difference by subtracting the first test voltage and the third test voltage; and
    the controller calculates the second difference by subtracting the second test voltage and the fourth test voltage.

* * * * *